United States Patent [19]

Moss

[11] Patent Number: 5,408,630
[45] Date of Patent: Apr. 18, 1995

[54] THREE-STATE VIRTUAL VOLUME SYSTEM FOR MANAGING DOCUMENT STORAGE TO PERMANENT MEDIA

[75] Inventor: Thomas D. Moss, Boulder County, Colo.

[73] Assignee: III G.I. Ltd., Golden, Colo.

[21] Appl. No.: 110,160

[22] Filed: Aug. 20, 1993

[51] Int. Cl.⁶ ............................................. G06F 15/40
[52] U.S. Cl. .................................... 395/425; 395/600; 364/419.19; 364/283.1; 364/965.79; 364/DIG. 2; 364/DIG. 1
[58] Field of Search ............................. 395/600, 425; 364/419.19

[56] References Cited

U.S. PATENT DOCUMENTS

| | | | |
|---|---|---|---|
| 4,682,305 | 6/1987 | Ishikawa | 395/425 |
| 4,985,863 | 1/1991 | Fujisawa et al. | 395/600 |
| 5,161,214 | 11/1992 | Addink et al. | 395/145 |
| 5,187,750 | 2/1993 | Behera | 382/7 |
| 5,287,497 | 2/1994 | Behera | 395/600 |

OTHER PUBLICATIONS

Thompson et al, "The Operation and Use of a 2 Terabyte Optical Archival Store", *Ninth IEEE Symposium on Storage Systems, Storage Systems: Perspectes*, 3 oct. 1988, pp. 88–92.

*Primary Examiner*—Paul V. Kulik
*Assistant Examiner*—Paul R. Lintz
*Attorney, Agent, or Firm*—Flehr, Hohbach, Test, Albritton & Herbert

[57] ABSTRACT

The virtual volume management system (VVM) is an improved method of managing document image files for transfer to CD-ROMs. The physical storage devices of a computer system are partitioned into logical volumes having a maximum capacity equal to the storage capacity of a single CD-ROM. One or more of these volumes are dedicated to a virtual volume set. The VVM software sets up and maintains data structures in the computer memory to maintain each of the volumes in the virtual volume set in one of three states: active, inactive, and locked. A volume in the active state is available to store document images files. Only one of the virtual volumes is active at any given time. The virtual volume management software transparently locks an active volume when it becomes full and selects another virtual volume in the inactive state as the new active volume. All data remains on-line for retrieval regardless of the state of the volume or transition of the volume to CD-ROM. After a volume fills, it's contents can be published directly to a CD-ROM or off loaded to some other media for transport to a CD-ROM publishing service. When a published CD-ROM replaces a filled volume, the document image files on that volume have their location updated to indicate their presence on the CD-ROM and the locked virtual volume is returned to the inactive state so that its storage space can be reused.

10 Claims, 4 Drawing Sheets

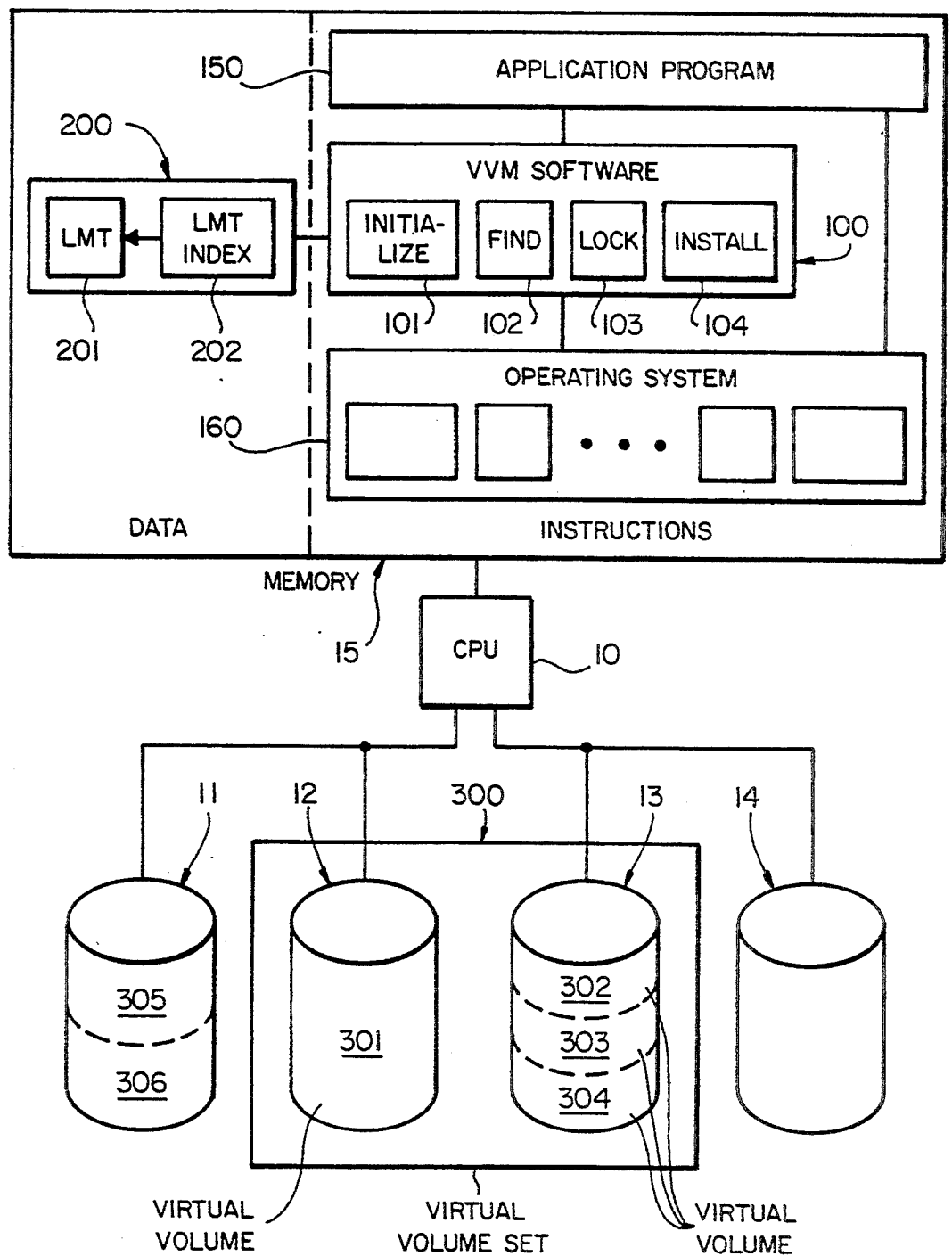
FIG_1

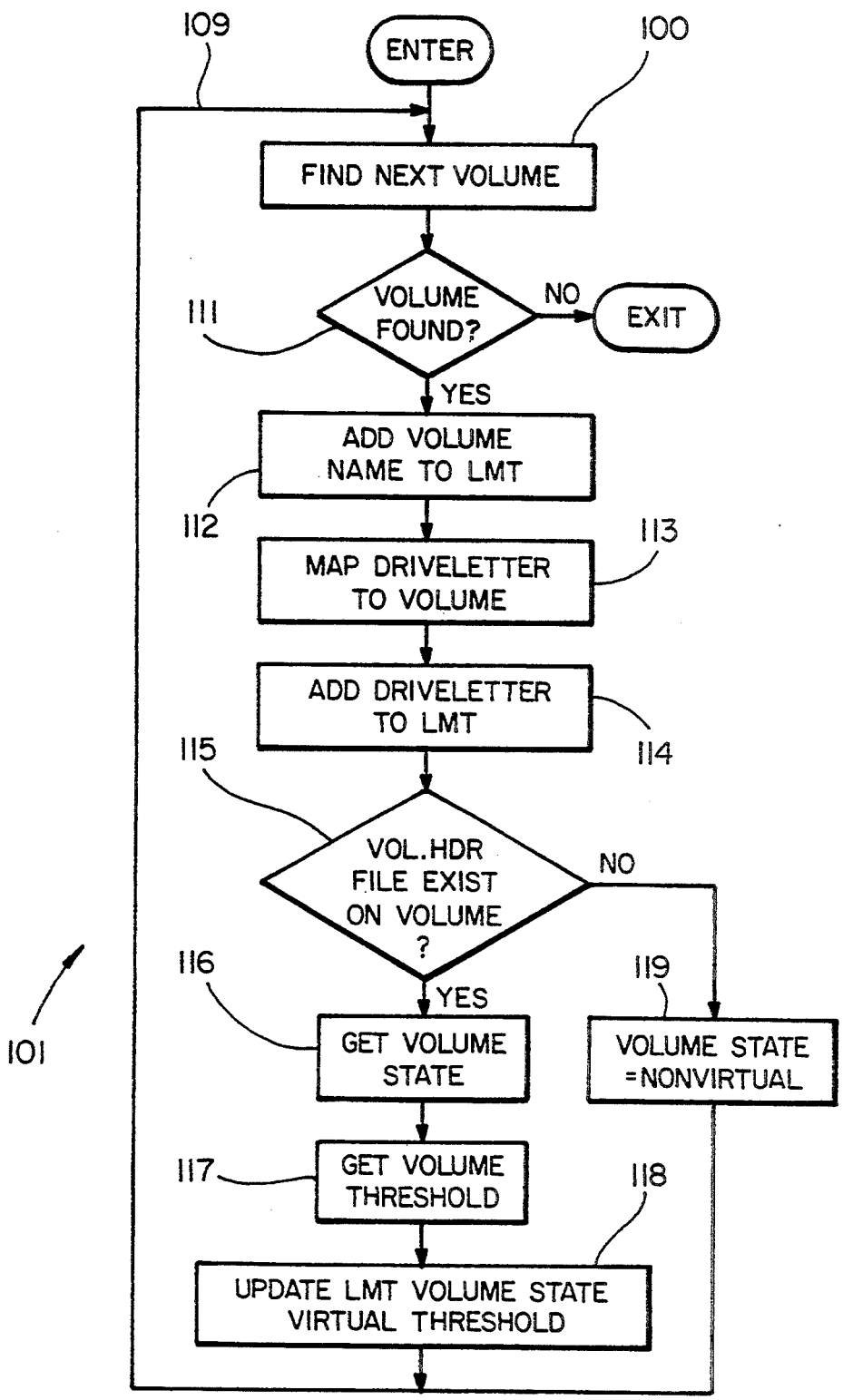
FIG_2

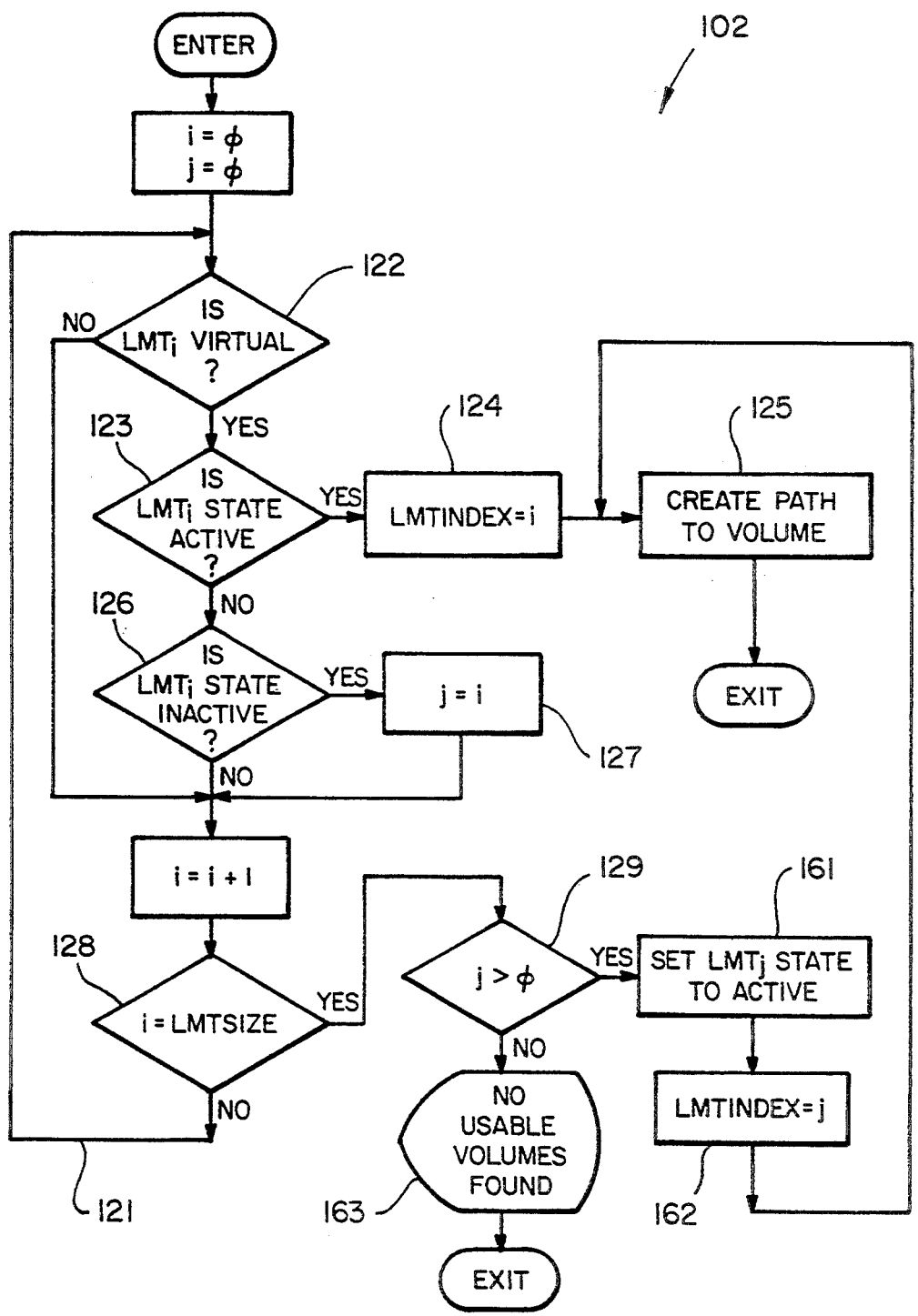
FIG_3

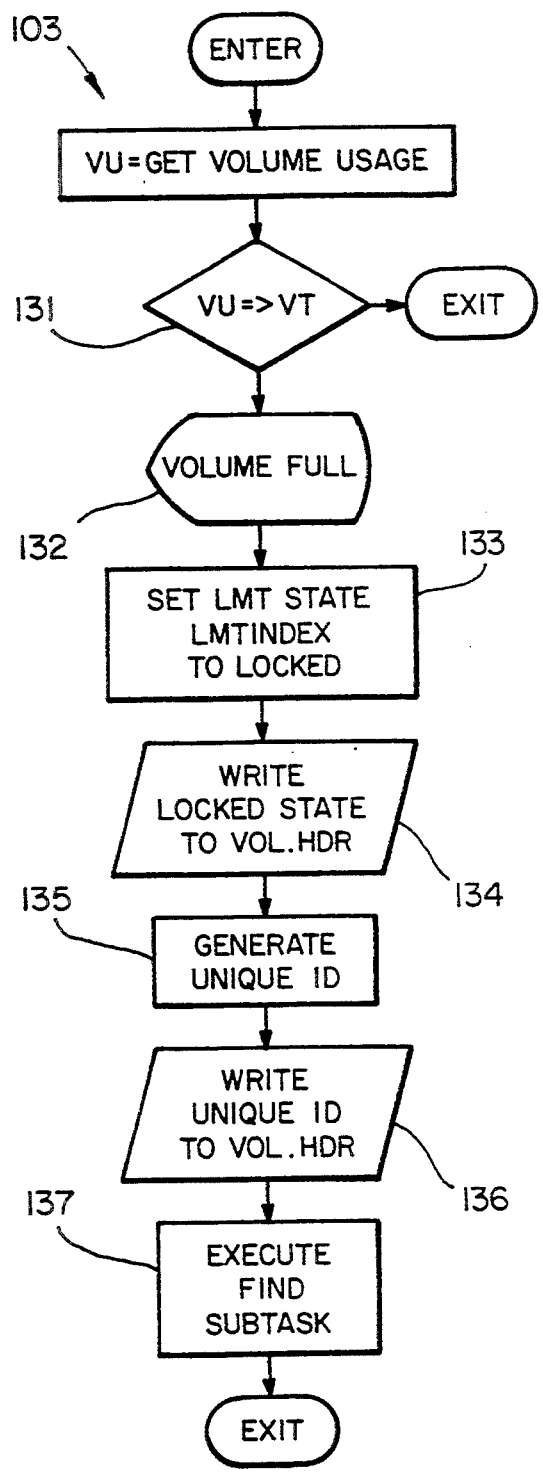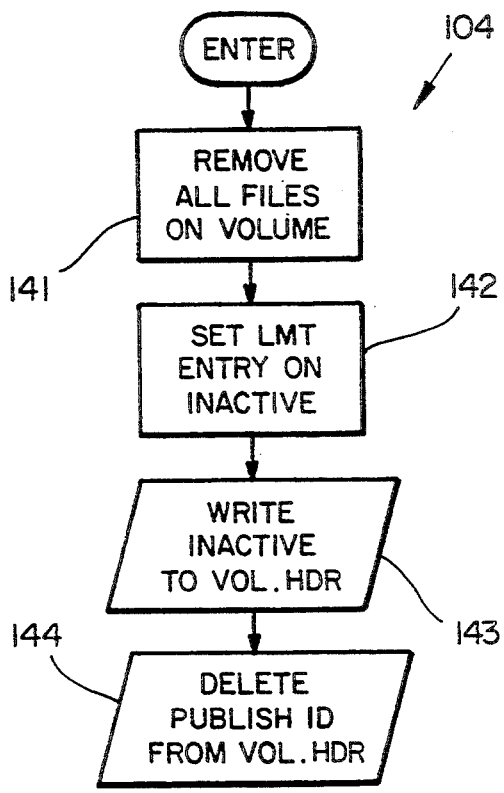
FIG_4
FIG_5

THREE-STATE VIRTUAL VOLUME SYSTEM FOR MANAGING DOCUMENT STORAGE TO PERMANENT MEDIA

FIELD OF THE INVENTION

This invention relates generally to document storage management systems and more specifically to the management of the storage of document files for migration to CD-ROMs.

BACKGROUND OF THE INVENTION

Businesses in diverse fields such as insurance, medicine and law require the storage and retrieval of a large number of documents. A useful storage system must provide an efficient, safe, and low cost method of preserving a large number of documents. At the same time, a good storage system should provide a quick and easy method of retrieving stored documents. The availability of computer systems and scanners that can quickly convert a paper document into an electronic data file has allowed the development electronic storage systems where documents are stored as files on permanent storage media in a computer system.

In the past, electronic storage systems have used WORM (write once optical disk) or Read-Write optical disks for archiving files because of their durability and storage capacity. Since WORM and Read-Write optical disks can be written much like a hard disk, document image files are simply written to the optical disk as they become available. Optical disks readers are expensive, however, and electronic storage systems usually use a juke box device to load optical disks into a small number of optical readers. Juke box devices degrade the storage system's performance because they are slow and unreliable and because they must physically manipulate an optical disk to insert it into a reader.

CD-ROM systems are also used for storing documents. CD-ROM readers are relatively cheap allowing an electronic storage system to have many readers. Thus, CD-ROM systems have an advantage over WORM and Read-Write systems because CD-ROM systems are not slowed down by a juke box device to load disks. However, unlike WORM and Read-Write optical disks, all the documents necessary to fill a 650 MB CD need to be published in one write operation. A CD-ROM can hold about 15000 document image files. These files are temporarily saved on storage devices like a computer hard disk. When enough files have accumulated on the hard disk to fill a CD-ROM, they are downloaded to a CD-ROM publisher or transferred to tape to be sent to an outside publisher. The user is responsible for determining when enough files are present to fill a CD-ROM and for initiating the writing of these files.

The CD-ROM publishing process is not instantaneous and the CD-ROM corresponding to the downloaded files may not be available for days or weeks. If a user wants continuous access to the image files, there is a period of time before the CD-ROM is published where the downloaded files must be maintained on the temporary storage device. The user is responsible for maintaining coherent file storage for these downloaded files. When the CD-ROM is published and installed in the system, the user is must update the location of all the transferred files to indicate their presence on that CD-ROM. Keeping track of the location and status of such a large number of files is a formidable and time consuming task.

OBJECTS AND SUMMARY OF THE INVENTION

This invention provides a solution for reducing the overhead associated with the archiving of document image files to CD-ROM. It allows the user to designate selected storage volumes to hold files for migration to CD-ROM. It provides for the transparent management of file storage to the designated storage volumes so that each designated storage volume will hold enough files to fill one CD-ROM. It makes the management and update of system directories much easier because it maintains a logical correspondence between a designated volume and a single CD-ROM.

The invention discloses a method of managing the storage of files on a computer system's physical storage devices for transfer to CD-ROMs. It provides for the partitioning of the physical storage devices into logical volumes with capacity equal to the storage capacity of a CD-ROM so that the data on each volume can be archived to one CD-ROM. It allows selected logical volumes to be designated as virtual volumes to be used for the storage and migration of files to CD-ROM. The invention transparently channels files onto these virtual volumes. Only one virtual volume is allowed to be written to at a time. When one volume is full, there is a transparent switch to another volume for subsequent storage. A full volume is locked and maintained to allow continued access to it's stored files until a CD-ROM corresponding to that volume has been published and installed in the system.

BRIEF DESCRIPTION OF THE DRAWINGS

FIG. 1 is a combined, logical block diagram of an embodiment of the virtual volume management system.

FIG. 2 is a flow diagram illustrating the Initialize subtask for initializing the data structures of the virtual volume management system.

FIG. 3 is a flow diagram illustrating the flow of the Find subtask for finding an active virtual volume.

FIG. 4 is a flow diagram illustrating the flow of the Lock subtask for detecting and locking a full virtual volume.

FIG. 5 is a flow diagram illustrating the Install subtask for reclaiming a locked virtual volume after that volume has been published to permanent storage media.

DETAILED DESCRIPTION OF THE DRAWINGS

FIG. 1 shows one embodiment of the document storage management system running on a computer system. The computer system includes a CPU 10 that performs computations and manipulates the computer system hardware in accordance with program instructions stored in the computer system memory 15. The computer system also includes a plurality of physical storage devices 11–14 for storing files. In this embodiment, the files stored on the physical storage devices are document files and more particularly image files. Document image files are created by scanning documents through a scanner which converts the image of the document into a series of values representing the pixels of the document image. Note that other types of files known in the art can be stored without departing from scope of the invention.

Application programs 150 that are resident in the computer system's memory 15 create or receive files from other sources and write those files to the physical storage devices 11–14. These application programs call predefined sets of instructions known as subtasks that instruct the CPU 10 to perform certain frequently-used computations or manipulations. The virtual volume management system (VVM) is a group of interrelated software subtasks 100 that are resident in the computer system memory 15. The VVM subtasks 100 provide a managed way for an application program to transfer files to the computer system's physical storage devices. These VVM subtasks create an manipulate the VVM data structures 200 in the computer system's memory to facilitate this storage management.

The operating system 160 is another group of subtasks resident in the computer system memory 15. The operating system 160 includes subtasks that instruct the CPU 10 to perform basic manipulations of the computer system's hardware. Application programs 150 and VVM subtasks 200 invoke the operating system to perform certain basic manipulations of the computer system's physical storage devices.

To implement the virtual volume management system, the user must call operating system subtasks to partition the physical storage devices 11–14 into logical volumes with maximum size corresponding to the storage capacity of a CD-ROM (650 MB). This partitioning assures that each logical volume will have its own unique path or drive letter assigned and that the files stored on any given volume will fit onto a single CD-ROM. An application program can write a file to a specific volume by specifying that volume's path or drive letter when it invokes the operating system subtasks to write the file.

The user designates the virtual volume set by invoking the operating system to create a virtual volume header file on each volume that is assigned to the virtual volume set. In the embodiment of FIG. 1, the virtual volume set 300 is comprised of several of the logical volumes on the computer system's physical storage devices 12–13. The virtual volume set includes the one logical volume 301 mapped onto physical storage device 12 and three logical volumes 302–304 mapped onto physical storage device 13. The two logical volumes 305, 306 mapped onto physical storage device 11 are not members of the virtual volume set 300. Note that the number of logical volumes dedicated to the virtual volume set can be varied without departing from the scope of the invention.

A virtual volume header file is identified by naming the file VOL.HDR. Each virtual volume in the virtual volume set has its own virtual volume header file. This file contains the volume's name, state, virtual threshold, and publish ID. The volume's state indicates the manner in which the volume is being used. The VVM subtasks 100 and data structures 200 maintain each volume in a virtual volume set in one of three states: active, inactive and locked. A virtual volume in the active state can be written to; only one volume can be in the active state at any given time. Inactive volumes are empty and can be made active any time there is no active volume or an active volume has become full. Any number of volumes can be in the inactive state. Volumes are placed in the locked state when they become full. The data on locked volumes can be read but not altered. Volumes that are not part of the virtual volume set are classified as being in a fourth state, nonvirtual.

The virtual volume threshold determines when a virtual volume is full and must be deactivated and locked. Each volume can have a different virtual volume threshold. The virtual volume threshold cannot be larger than the maximum size of a logical volume that is determined when the operating system creates the logical partition on a physical storage device. The virtual volume threshold can be less than the actual size of the volume to allow for a percentage of the virtual volume space to remain free so non-document image files and data can be added to the virtual volume before publishing the virtual volume to CD-ROM. In the preferred embodiment, this extra space is used to periodically place indexing, catalogue and directory information in a sequence of published CD-ROMs.

The publish id is a unique identifier that is generated and written to the VOL.HDR file when a volume is locked. This identifier is used later when a published CD-ROM is installed in the system. The user must check that the publish ID on the locked volume matches the publish ID on the CD-ROM before the volume is erased and the location of the data is updated. This check insures the correct volume is updated.

The VVM data structures 200 keep track of all logical volumes in the computer system. The logical mount table (LMT) 201 is a dynamic allocable structure created in the computer system's memory that contains one entry for each volume in the system. Each entry consists of a volume name, the drive letter or path mapped to that volume, the virtual threshold of the volume, and the current volume state. The LMT index 202 stores a value that indicates which LMT entry corresponds to the active volume.

The user must also create and run application programs 150 for receiving or creating files and for writing those files to volumes in the virtual volume set. VVM subtasks Initialize 101, Find 102, and Lock 103 are used by application programs 150 to control the writing of files to virtual volumes. An application program must first invoke the Initialize subtask 101 to create and initialize the VVM data structures 200. An application program must call the Find subtask 102, before writing each file to a disk to find the active virtual volume. The Find subtask 102 will provide the application program with a path or drive letter to the active virtual volume. The application program then invokes an operating system subtask using the path or drive letter provided by the Find subtask to write a file to the active volume. After writing a file, the application program must call the Lock subtask 103, to check if the active volume has become filled and to switch to a new active volume if the old active volume is full.

The user can publish a full virtual volume to CD-ROM. To publish a volume, the files on that volume are downloaded to an attached CD-ROM publisher or to a tape that is sent to a publisher. The user can also create and periodically run another application program for updating the location of files when a CD-ROM corresponding to a full virtual volume is installed in the computer system. This application program updates the location of files on the full virtual volume to indicate that files are located on a CD-ROM. The application program also checks to make sure that the publish ID of the installed CD-ROM matches the publish ID of the full virtual volume and then invokes the Install subtask 104 to reclaim the space on the full volume for subsequent storage.

FIG. 2 shows the flow of the Initialize subtask that is called when the virtual volume management system is started to initialize the virtual volume management data structures. The Initialize subtask enters a loop indicated by arrow 109, where it examines each logical volume mounted on the computer system. At 112, a new entry is created in the LMT for each logical volume. The subtask calls an operating system subtask to get the physical drive letter to the volume at 113 and records the drive letter into the LMT at 114. The subtask then checks to see if the current volume is a virtual volume by looking for the VOL.HDR file at 115. If the volume is a virtual volume, the subtask gets the volume state at 116, the volume threshold at 117 and enters the information into the LMT at 118. If no VOL.HDR file is detected then the volume state in the LMT is set to non-virtual at 119. These steps will be repeated until there are no more logical volumes to process as indicated at 111.

FIG. 3 shows the flow of the Find subtask which is invoked when a application program needs to write to a virtual volume to generate a path to the virtual volume for the application program. The Find subtask enters a scanning loop indicated by the arrow 121 where it sequentially examines the entries in the LMT table. The subtask screens out non virtual volumes at 122. It checks to see if a virtual volume is active at 123. If the subtask finds an active entry it sets the LMT index to point to that volume's entry in the LMT at 124. It then creates a path to that volume using data stored for that particular virtual volume in the LMT as indicated by 125. If a virtual volume is not active, the subtask checks to see if the volume is inactive at 126. The subtask keeps track of the latest inactive volume encountered as indicated by 127. At 128 the subtask checks to see if the LMT has been completely traversed. If the subtask traverses the entire LMT without finding an active virtual volume, then there is no active virtual volume. At this point, the subtask checks for a inactive volume at 129. If there is an inactive volume, the subtask converts it to an active volume at 161 and sets the LMT index to point to this volume's entry at 162. The subtask next creates a path the to the new active volume using the data stored for that particular volume as indicated at 125. If no inactive volume can be found for conversion to an active volume the subtask signals the application program that no usable volumes could be found as indicated at 163.

FIG. 4 shows the flow of the Lock subtask which is called after each file is written to the active virtual volume to determine if that volume is full and ready to be locked. This subtask invokes an operating system subtask to get the amount of space on the active volume that has been used for storing files. The subtask compares this amount against the volume's virtual volume threshold at 131. If the amount of space used for storing files equals or exceeds the virtual volume threshold then the active virtual volume is full. When a full volume is detected, the subtask alerts the application program of the condition at 132, locks the active virtual volume at 133 by updating status information in the LMT at 134, generates a publish id at 135, writes the publish id into the volume's VOL.HDR file at 136, and calls the Find subtask to select a new active volume at 137.

FIG. 5 shows the flow of the Install subtask which is called to return a locked virtual volume to the inactive state so that it can be used to store new files. It is activated when a CD-ROM corresponding to a locked virtual volume is installed in the system and the location of the files on the locked virtual volume have been changed to indicate that the files are located on the CD-ROM. The Install subtask invokes operating system subtasks to delete all files on the locked volume at 141. The subtask changes the volume's state entry in the LMT to inactive at 142. Then it changes the volumes state in the VOL.HDR file at 143. Finally the subtask deletes the unique publish ID from the VOL.HDR file at 144.

The following pseudo code shows the structure of VVM software including the Initialize, Find and Lock subtasks:

```
VVM Pseudo Code
global structure {
            BOOLEAN virtual
            INTEGER state
            STRING driveletter
            STRING volumename
            INTEGER threshold
            } LMT[LMTSIZE]
global INTEGER LMTINDEX
global STRING PATHNAME
/* Initialize subtask */
procedure VVM_INITIALIZE
INTEGER i
STRING volname
i = 0
while (volname = os_findnextvolume()) = TRUE
      do
            LMT(i).volumename = volname
            LMT(i).driveletter = os_mapdriveletter(volname)
            os_open (using_filename = vol.hdr,using_drive = driveletter)
            if open_successful then
                  LMT(i).virtual = TRUE
                  LMT(i).state = os_read(keyword = VolumState)
                  LMT(i).threshold = os_read(keyword = Threshold)
            else
                  LMT(i).virtual = FALSE
            end if
end while
/* Find subtask */
procedure VVM_FIND
integer i,j
i = 0
```

-continued

```
j = 0
while i < LMTSIZE
        do
                if LMT(i).virtual = TRUE then
                        if LMT(i).state = 'ACTIVE' then
                                LMTINDEX = i
                                ap_buildpathtovolume (PATHNAME)
                           exit
                        end if
                        if LMT(i).state = 'INACTIVE' then
                                j = i
                           end if
                end if
                i = i + 1
end while
if j > 0 then
        LMT(j).state = 'ACTIVE'
        LMTINDEX = j
        ap_buildpathtovolume(PATHNAME)
else
        display 'No usable volumes found!'
end if
exit
/* Lock subtask */
procedure VVM_LOCK
volumeusage = os_getvolumeusage(LMT[LMTINDEX].volumename)
if volumeusage => LMT[LMTINDEX].threshold then
        display 'Volume Full'
        LMT[LMTINDEX].state = 'LOCKED'
        write locked state vol.hdr
        generate unique id
        write id to vol.hdr
        call VVM_FIND
end if
exit
/* Install subtask */
procedure VVM_INSTALL
STRING delfilename
INTEGER i
while (delfilename = os_findnextfile(UPDATEVOL)) = TRUE
        do
                os_delete(using_filename = delfilename, using_drive =
driveletter)
end while
i = 0
while (LMT(i).volname <> UPDATEVOL and i < LMTSIZE)
        do
                i = i + 1
end while
if i <> LMTSIZE then
        LMT(i).state = 'INACTIVE'
        write inactive state to vol.hdr
        delete publish.id from vol.hdr
end if
exit
```

The following psuedo code fragments show the use of the VVM subtask calls in an application program:

```
ProgramStartUpProcedure
{
    .
    .
    /* Setup structures used by VVM_FIND & VVM_LOCK */
    call VVM_INITALIZE
    .
    .
}
WriteProcedure ()
{
    prepare for writing
    .
    .
    call VVM_FIND
    .
    .
```

```
    write data to file using PATHNAME
    .
    .
    .
    call VVM_LOCK
}
DirectoryUpdateProcedure
{
    .
    .
    .
    examine publish id in the vol.hdr of new cd-rom
    .
    .
    .
    find the corresponding virtual volume whose publish.id matches new cd-rom
    publish id
    .
    .
    .
    update the image location of all files on the corresponding virtual volume to
    indicate their presence on the new cd-rom
    .
    .
    .
    UPDATEVOL = the volume name of the corresponding virtual volume
    .
    .
    .
    call VVM_INSTALL
}
```

While a certain illustrative embodiment of the present invention has been shown in the drawings and described above in detail, it should be understood that there is no intention to limit the invention to the specific form disclosed. On the contrary, the intention is to cover all modifications, alternative constructions, equivalents and uses falling within the spirit of the invention as expressed in the appended claims.

What is claimed:

1. A document storage management system for use with a computer system having a central processing unit and one or more physical storage devices on which files are stored comprising:
   one or more virtual volumes mapped onto said one or more physical storage devices for storing files, each of said one or more virtual volumes having a specified maximum storage space that can be used for storing files;
   state means for maintaining said one or more virtual volumes in a first, second or third states; said first state wherein a virtual volume is available to store files; only one of said one or more virtual volumes is in said first state at any given time; said second state wherein all of said specified maximum storage space on a virtual volume has been used for storing files; said third state wherein a virtual volume is not being used for storing files; said state means including means for determining the state of each of said one or more virtual volumes;
   means, coupled to said state means, for indicating which of said one or more virtual volumes is in said first state upon being invoked; said indicating means including means for finding said only one virtual volume in said first state; said indicating means putting one of said one or more virtual volumes in said third state into said first state when there is no volume in said first state;
   means, coupled to said state means, for changing said only one virtual volume in said first state into said second state upon being invoked; said changing means including means for detecting that all of said specified maximum storage space of said only one virtual volume in said first state has been used for storing files on said only one virtual volume in said first state; said changing means putting said only one virtual volume in said first state into said second state when all of said specified maximum storage space of said only one virtual volume in said first state has been used for storing files on said only one virtual volume in said first state;
   at least one application program for writing files to said one or more virtual volumes; said at least one application program invoking said indicating means each time said at least one application program needs to write a file to said one or more virtual volumes; said at least one application program causing said file to be written to said only one virtual volume in said first state indicated by said indicating means; said at least one application program invoking said changing means after each time said at least one application program causes a file to be written to said only one virtual volume in said first state.

2. The document storage management system of claim 1 further comprising:
   at least one permanent media device for permanently storing the files written to said one or more virtual volumes;
   said specified maximum storage space being less than or equal to the storage space on said at least one permanent media device; whereby the data on each one of said one or more virtual volumes will fit on one of said at least one permanent media devices.

3. The document storage management system of claim 2 further comprising:
   means for converting a virtual volume in said second state into said third state upon being invoked;
   at least one of said one or more virtual volumes in said second state; the files on one of said at least one or more virtual volumes in said second state having been transferred to one of said at least one permanent media devices;

an application program for locating files stored on said at least one permanent media devices and said one or more physical storage devices; said application program for locating files stored on said at least one permanent media devices and said one or more physical devices invoking said converting means upon the installation of said one of at least one permanent media device; whereby the files on said at least one virtual volume in said second state are continuously available throughout the transfer process to one of said one or more permanent media devices.

4. The document storage management system of claim 3 wherein the said at least one permanent media device is comprised of a CD-ROM system including one or more CD-ROMs.

5. The document storage management system of claim 1 further comprising:

means for converting a virtual volume in said second state into said third state upon being invoked;

a CD-ROM system for storing and retrieving the files transferred from said one or more virtual volumes; said CD-ROM system including one or more CD-ROMs for storing said files;

said specified maximum storage space being less than or equal to the storage space on said one or more CD-ROMs;

at least one of said one or more virtual volumes in said second state; the files on one of said at least one or more virtual volumes in said second state having been transferred to one of said one or more CD-ROMs;

a application program for locating files stored on said CD-ROM system and said one or more data storage devices; said application program for locating files stored on said CD-ROM system and said one or more data storage devices invoking said converting means upon the installation of said one of said one or more CD-ROMs; whereby the files on said at least one virtual volume in said second state are continuously available throughout the transfer process to one of said one or more CD-ROMs.

6. A method of document storage management in a computer having a central processing unit and one or more physical storage devices on which files are stored, the steps of the method comprising:

mapping one or more virtual volumes onto said one or more data storage devices; each of said one or more virtual volumes having a specified maximum storage space that can be used for storing files;

maintaining each one of said one or more virtual volumes in either a first, second or third state; said first state wherein a virtual volume is able to store files; only one of said one or more virtual volumes is in said first state at any given time; said second state wherein all of said specified maximum storage space on a virtual volume has been used for storing files; said third state wherein a virtual volume is not being used for storing files;

providing means for indicating which of said one or more virtual volumes is in said first state upon being invoked; said indicating means including means for finding said only one virtual volume in said first state; said indicating means putting one of said one or more virtual volumes in said third state into said first state when there is no volume in said first state;

providing means for changing said only one virtual volume in said first state into said second state upon being invoked; said changing means including means for detecting that all of said specified maximum storage space of said only one virtual volume in said first state has been used for storing files on said only one virtual volume in said first state; said changing means putting said only one virtual volume in said first state into said second state when all of said specified maximum storage space of said only one virtual volume in said first state has been used for storing files on said only one virtual volume in said first state;

running at least one application program for writing files to said one or more virtual volumes;

invoking said indicating means each time said at least one application program needs to write a file to a virtual volume; said at least one application program causing said file to be written to the virtual volume indicated by said indicating means;

invoking said changing means each time after said at least one application program causes a file to be written to said only one virtual volume in said first state.

7. The method of claim 6 further characterized by:

providing one or more permanent media devices;

having at least one of said one or more virtual volumes in said second state;

transferring the files written to said at least one of said one or more virtual volumes in said second state onto said one or more permanent media devices;

said specified maximum storage space being less than or equal to the storage space on said permanent media devices; whereby the data on each one of said at least one virtual volumes in said second state is transferred to one of said one or more permanent media devices.

8. The method of claim 7 further comprising:

having one or more virtual volumes in said second state;

transferring the files on each of said one or more virtual volumes in said second state to a respective one of said one or more permanent media devices;

putting each of said one or more virtual volumes in said second state into said third state upon the installation of said respective one of said one or more permanent media devices; whereby the files on each of said one or more virtual volumes in said second state are continuously available throughout the transfer process to said one or more permanent media devices.

9. The method of claim 8 wherein said one or more permanent media devices is comprised of a CD-ROM system including one or more CD-ROMs.

10. The method of claim 6 further characterized by:

providing a CD-ROM system for storing and retrieving the data transferred from said one or more virtual volumes; said CD-ROM system including at one or more CD-ROMs for storing said transferred data;

said specified maximum storage space being less than or equal to the storage space on said one or more CD-ROMs for storing said transferred data;

having one or more virtual volumes in said second state;

transferring the files on each of said one or more virtual volumes in said second state to a respective one of said one or more CD-ROMs;

putting each said one or more virtual volume in said second state into said third state upon the installation of each respective said one or more CD-ROMs; whereby the files on said virtual volume in said second state are continuously available throughout the transfer process to said CD-ROM system.

* * * * *